United States Patent
Greenshpan et al.

(10) Patent No.: US 7,887,329 B2
(45) Date of Patent: Feb. 15, 2011

(54) SYSTEM AND METHOD FOR EVALUATION AND TRAINING USING COGNITIVE SIMULATION

(75) Inventors: Ya'akov Greenshpan, Raanana (IL); Gil Hupert-Graff, Tel Aviv (IL); Lilach Armony-Shimoni, Haifa (IL); Danny Dankner, Shmaryahu (IL)

(73) Assignee: Ace Applied Cognitive Engineering Ltd, Netanya (IL)

( * ) Notice: Subject to any disclaimer, the term of this patent is extended or adjusted under 35 U.S.C. 154(b) by 1753 days.

(21) Appl. No.: 10/519,232

(22) PCT Filed: Jul. 10, 2003

(86) PCT No.: PCT/IL03/00575

§ 371 (c)(1),
(2), (4) Date: Dec. 27, 2004

(87) PCT Pub. No.: WO2004/006747

PCT Pub. Date: Jan. 22, 2004

(65) Prior Publication Data

US 2006/0003298 A1    Jan. 5, 2006

(51) Int. Cl.
*G09B 19/00* (2006.01)
(52) U.S. Cl. .................. 434/236; 434/247; 434/248
(58) Field of Classification Search .......... 434/236, 434/247, 322–323, 350; 463/1–5, 34–36; 359/630; 705/26
See application file for complete search history.

(56) References Cited

U.S. PATENT DOCUMENTS

| 4,341,383 A * | 7/1982 | Reichert | 463/4 |
| 4,751,642 A * | 6/1988 | Silva et al. | 473/152 |
| 6,746,247 B2 * | 6/2004 | Barton | 434/247 |
| 7,165,973 B2 * | 1/2007 | Cantor | 434/322 |

FOREIGN PATENT DOCUMENTS

WO    WO02/05247    1/2002

OTHER PUBLICATIONS

Bliss, J. et al.—'Communality of videogame performances with tracking tasks'—Perceptual Motor Skills; Aug. 1991;73(1):23-30.*
Armony et al "Generality of Control Processes in Task Switching" Ph d. dissertation. Industrial Engineering and Management and Management, Technion 2002.
Ball et al; "Age and visual search: expanding the useful field of view" Journal of the Optical Society of America 1988 5:2210-2219.

(Continued)

*Primary Examiner*—Xuan M Thai
*Assistant Examiner*—Timothy Musselman
(74) *Attorney, Agent, or Firm*—Dvorah Graeser

(57) ABSTRACT

A system and method for training a subject for control processes, preferably for a particular task. The task may optionally comprise a sport, such as basketball for example; additionally or alternatively, the task may comprise an area of skills to be improved, such as general improvement of physical reflexes and/or reactions. The present invention enables cognitive skills associated with the task to be improved, without requiring physical fidelity to the physical actions that are normally performed during the actual task. Improving these cognitive skills results in improved control processes during performance of the actual task by the subject.

35 Claims, 11 Drawing Sheets

OTHER PUBLICATIONS

Dennis et al: Computer based simulation as an adjunct to Ab Initio flight training. The International Journal of Aviation Psychology 1998. 8(3) 261-277.

Gopher et al; "Switching Tasks and attention policies" Journal of Experimental Psychology General 2000 V129(3), 308-339.

Gopher et al; "Transfer of skill from a computer game trainer to flight" Human Factors 1994, 1994 36, 387-40.

Kramer et al "Training for Attentional Control in Dual Task Settings—A comparison of young and old adults" 1995, Journal of Experimental Psychology Applied vol. 1 50-76.

Ortiz Effectiveness of PC-based flight simulation. The International Journal of Aviation Psychology 1994 4-285-291.

Phillips et al "Uses of part-task trainers in instrument flight training". In r. Jenson (ed) 1993 Proceeding of the 7th international symposium on Aviation Psychology (pp. 743-746) Columbus—the Ohio University.

Jonathan D. Cohen, et al, 2004, A Systems-Level Perspective on Attention and Cognitive Control, Cognitive Neuroscience of Attention, pp. 71-90, Guilford Publications, New York, NY.

Joshua S. Rubinstein, et al, 2001, Executive Control of Cognitive Processes in Task Switching, Journal of Experimental Psychology: Human Perception and Performance 2001, vol. 27, No. 4, 763-797.

Daniel Gopher, The skill of attention control: Acquisition and execution of attention strategies, Attention and Performance XIV: Synergies in Experimental Psychology, Artificial Intelligence, and Cognitive Neuroscience—A Silver Jubilee. Cambridge, MA: MIT Press. 1994, pp. 300-322.

Wickens et al; Memory, Learning, and Training, Learning and Long Term Memory, Engineering Psychology and Human Performance Second Edition, Prentice Hall, Upper Saddle River, NJ, USA, 2000, pp. 240 and 241.

* cited by examiner

SYSTEM AND METHOD FOR EVALUATION AND TRAINING USING COGNITIVE SIMULATION

FIELD OF THE INVENTION

The present invention relates to cognitive training systems, and more particularly to a system for directly enhancing at least one cognitive control process of an athlete.

BACKGROUND OF THE INVENTION

Many daily activities, and particularly sports-related activities, involve cognitive skills in general, and cognitive control processes in particular, such as executive control, that are responsible for aspects such as planning and sequencing activities, focusing attention, selecting between environmental aspects, switching and dividing attention between different actions, mental rotation, peripheral vision and perception, pattern recognition etc. Such skills are involved in every decision and move of an athlete, and the level of such skills greatly affects the performance of the athlete or any other individual performing a task. Training can significantly improve the level of cognitive skills, and various training programs are used to achieve such an improvement. Such programs include physical and simulated exercises.

Studies have shown that complex cognitive skills in general, and psychomotor skills in particular can be trained in laboratory settings and transferred to real-life job or task settings such as aviation (Gopher et al., 1994; Phillips et al., 1993; Ortiz, 1994; Dennis and Harris, 1998). For example, practice effects on the ability of subjects to localize targets in the periphery have been shown (Ball et al., 1988), with effects being maintained over a six-month period. Other studies have shown that attention control, executive control and other control skills such as switching between tasks, dividing attention and selecting between speed and accuracy emphases can also be trained and transferred (Gopher et al., 2000; Armony and Gopher, 2002; Kramer et al., 1995; Gopher et al., 1994). A list of references is attached.

Airplane or helicopter pilots may use a flight simulator to practice physical and mental skills associated with flying an aircraft. These simulators allow both physical and cognitive fidelity to the various cognitive and physical actions performed during flying. However, other types of tasks are more difficult to train with a simulator, and/or a typical high physical fidelity simulator is inadequate for the task to be trained. For example, sports such as basketball, which require a large amount of physical movement, including movement of the body of subject across a large court, are difficult if not impossible to train with currently available simulators.

Many cognitive trainers known to the art are dedicated to specific task components, such as peripheral vision. Other known simulation systems which replicate various aspects of complex tasks are designed with a high degree of physical fidelity e.g. they provide similar stimuli, require the same motor responses, and so forth.

WO 02/05247 to Cognifit Ltd. teaches a method and apparatus for testing and training cognitive ability. This relies on selection and training of one or more separate, discrete, cognitive skills, without providing a system for enhancing an integrated cognitive control process.

No system currently exists for training a comprehensive range of cognitive components without requiring complete physical fidelity to the physical actions being performed during performance of the actual task.

SUMMARY OF THE INVENTION

The background art does not teach or suggest a system for training multiple control processes without restriction to physical fidelity.

The present invention overcomes these drawbacks of the background art by providing a system and method for training a subject for control processes, preferably for a particular task. The task may optionally comprise a sport, such as basketball for example; additionally or alternatively, the task may comprise an area of control processes to be improved, such as general improvement of physical and/or mental skills and/or reactions. The present invention enables control processes and/or skills associated with the task to be improved, without requiring physical fidelity to the physical actions that are normally performed during the actual task. Improving these control processes results in improved executive control, attention control and any other control mechanisms and real-time decision-making during performance of the actual task by the subject.

Control processes, including but not limited to, executive control, attention control, focusing attention, dividing attention, stop-restart process and so forth may preferably be trained without requiring absolute or even partial physical fidelity to the physical actions that are performed during the task, by instead using cognitive fidelity to the cognitive tasks. This type of fidelity requires a complete different type of trainer and also a different training plan, since rather than having the subject mechanically reproduce all of the physical actions required for performing the task, a training plan may instead be used which causes the subject to perform relevant cognitive actions, even if these actions do not appear to be identical to those used during the task itself. Furthermore, such cognitive actions can only be performed if they have been determined through an analysis of the task itself; examining a task from the perspective of cognitive actions has not been generally performed, so decomposing and analyzing the task to determine a plurality of cognitive skills that are required is preferably performed for the present invention.

Once such an analysis has been performed, a trainer may preferably be developed which can train the subject for these cognitive skills. For example, the trainer may optionally and preferably be designed according to a cognitive simulator, which itself would preferably simulate the necessary cognitive actions to be performed during a training session. A training plan would also optionally be developed, for training the subject with the trainer.

According to preferred embodiments of the present invention, the cognitive simulator is preferably designed by decomposing a task, and mapping specific cognitive actions performed during the task with cognitive skills. These skills are then in turn trained by particular components of the trainer, again preferably by mapping the skills to be trained with the particular component(s) of the trainer which are used for such training.

According to other preferred embodiments of the present invention, at least one aspect of the design process is preferably automated. For example, a task may optionally be analyzed for particular cognitive skills automatically. More preferably, the trainer and/or the cognitive simulator could optionally be designed automatically, by mapping cognitive skills to trainable actions automatically. Most preferably, a template or underlying structure is provided which enables such mapping to be performed automatically.

The system of the present invention is designed to enhance flexible cognitive skills that can be transferred to real-life situations, hence improving the overall performance of the subject.

In a preferred embodiment of the present invention, the training system is applied to training of basketball players.

According to other preferred embodiments of the present invention, the training system is applied to training of other types of sports, including but not limited to, sports which require ball-handling skills or skills in handling some type of object, including but not limited to soccer, baseball, football, golf, hockey, tennis and rugby; sports which require operation of a vehicle such as bicycling, motorcycle racing and car racing. The present invention may also optionally be applied to martial arts, such as wrestling, judo, karate, sumo, Jujitsu, kick boxing, Aikido, taekwondo, and Kung-Fu. The present invention may also optionally be implemented for any work-related tasks, such as tasks performed by construction or other manual workers, skilled laborers, and brokers or traders in the stock exchange or other financial markets.

Hereinafter, the term "control processes" or "control skills" includes any type of cognitive control mechanism, including but not limited to, executive control, attention control and so forth.

The cognitive trainer of the present invention has many advantages. For example, the training session may optionally be "compressed" in a way that the amount of cognitive operations that are normally performed in one month or so in the "real world" will preferably be done in few hours within the cognitive simulator.

For the present invention, a software application could be written in substantially any suitable programming language, which could easily be selected by one of ordinary skill in the art. The programming language chosen should be compatible with the computational device according to which the software application is executed. Examples of suitable programming languages include, but are not limited to, C, C++ and Java.

In addition, the method of the present invention could be implemented as software, firmware or hardware, or as a combination thereof. For any of these implementations, the functional stages performed by the method could be described as a plurality of instructions performed by a data processor. Also, the present invention may optionally be implemented mechanically.

BRIEF DESCRIPTION OF THE DRAWINGS

The invention is herein described, by way of example only, with reference to the accompanying drawings.

DETAILED DESCRIPTION OF THE PREFERRED EMBODIMENTS

The system and method of the present invention are suitable for enhancing the control processes and other types of cognitive processes relevant to a wide range of sports and sport-related activities, and other types of activities that require cognitive skills. Such activities may include the following non-limiting examples: basketball, baseball, soccer, American football, ice hockey, field hockey, rugby, lacrosse, cricket, golf, tennis, table tennis, volleyball, car racing, motorcycle racing, bicycle racing, polo, boxing, skiing, snowboarding, fencing, windsurfing, sailing, kite surfing, hang-gliding, martial arts (including but not limited to, kick boxing, wrestling, judo, karate, sumo, Jujitsu, Aikido, taekwondo, Kung-Fu). Features of the system may optionally and preferably vary according to the particular activity, such as a sport or game, to which it is applied.

The training system of the present invention may optionally be presented to the subject through a computer-based interface, optionally and preferably featuring a combination of hardware operated by the subject, and a plurality of instructions for operating the hardware. The instructions may optionally be implemented as software. The system may optionally and preferably comprise a plurality of modules, optionally comprising part of a computer network, such that at least two players are competing against each other in the training session, for example through computer-based interfaces. Each module may optionally be used simultaneously by one or more users.

The various tasks presented by the training system and the level of complexity or difficulty may be determined by various system parameters. Hence, for example, the velocity, movement patterns, number and shape of moving objects displayed on the screen, the scoring system, and the responsiveness of the input device may optionally and preferably be adjusted by the user or the training supervisor, and/or may also optionally be adjusted automatically. The system may therefore be customized to the individual requirements of the athlete and/or of a group or team of athletes. The present invention is therefore preferably capable of training team skills and/or teamwork by individual subjects.

For example, according to an illustrative but non-limiting embodiment of the present invention, the method may optionally feature decomposition and analysis of the task into a cognitive skill set. Next, the set of skills is preferably used to design and implement the cognitive simulator. Next, the effect of the simulator on the ability of the subject to perform the task is preferably measured, for assessing the efficacy of the simulator for improving the skills of the subject for performing the task. The physical action performed by the subject during use of the trainer does not require physical fidelity to the actual physical action involved in performing the cognitively equivalent task in a real-life situation.

Figure 1:
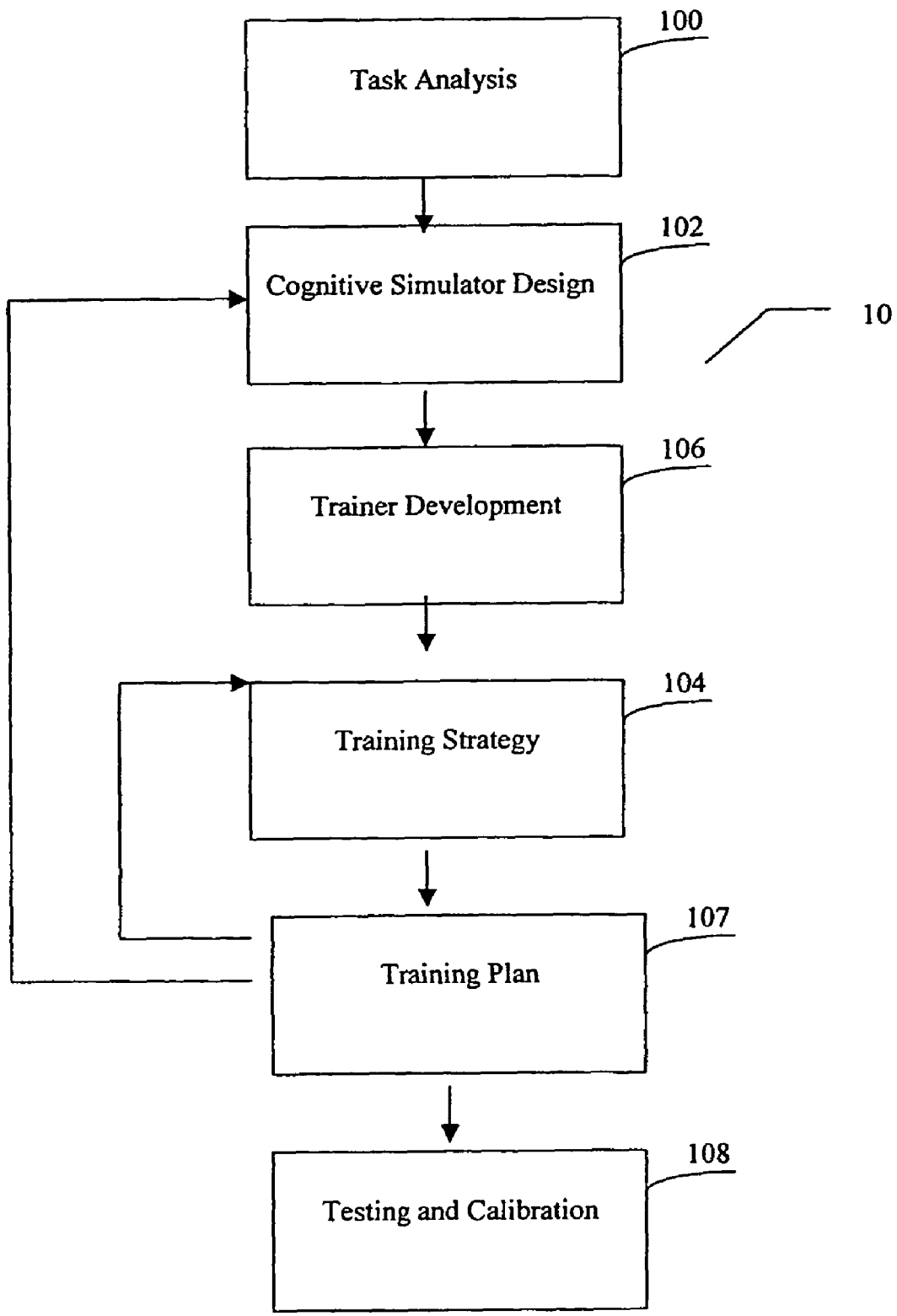
FIG. 1 is an overview of the process of Cognitive Trainer Development.

Referring now to FIG. 1, an overview of the research and development processes required for each embodiment of the cognitive training system 10 of the present invention is shown.

The method of the present invention optionally and preferably first uses the stages of decomposing a task into a plurality of cognitive skill, mapping the relevant cognitive skills, defining the training strategy, and specifying the cognitive game-like software to be used for the training system.

The initial stage of task analysis 100 optionally and preferably involves decomposition and analysis of the various task components. These task components represent actions to be performed during the task, which are related to cognitive skills which may be trained by the present invention. Preferably, these task components are related to control processes. Optionally and more preferably, the actions performed during the task are mapped to specific cognitive skills in which the subject may be trained.

Optionally, such mapping is performed through manual observation of the task to be performed; alternatively and preferably, mapping is performed at least semi-automatically, once sufficient information about the task has been entered (such as the physical actions performed during a game, for example).

As shown in FIG. 1, next stage 102 is performed, whereby the required features of a training system 10 for enhancing cognitive skills may be identified.

The system must maintain cognitive resemblance between the training environment and the real task environment, e.g. similar processing modalities, similar control process requirements, etc. The Training System 10 of the present invention must simulate the cognitive requirements involved in a specific game, sport or other trainable activity. For example, the skill of executive control may be trained by use of tasks which maintain the same spatial vs. semantic processing modality.

Components of Training System 10 are mapped to the cognitive skills that were identified in initial task analysis 100 and an apparatus is designed having components for activating the same cognitive skills which the subject would be required to use in a real-life game. These components are optionally and preferably incorporated as integral parts and may optionally be accessed through a computer-based interface, for example, a computer game-like interface. An example of such a game interface is presented in greater detail below with respect to FIG. 10.

Analysis of the task results in the determination of a plurality of actions, which are preferably mapped to basic skills. These basic skills may then optionally be combined into a profile for training the subject, more preferably according to at least some aspect of control processes (such as attention control for example).

Cognitive simulator design stage 102, is optionally and preferably followed by Trainer Development stage 106, which is dependent on the platform selected for the trainer, as described in further detail below.

Following Trainer Development stage 106, Training strategy 104 is formulated. Training strategy 104 optionally and preferably includes detailed, stage-by-stage instructions as to the manner in which the training process should be carried out.

Next, a training plan 107 is preferably developed, which enables the trainer to be used with individual subjects and/or teams as described in greater detail below. The final stage in the process is Testing and Calibration stage 108. This stage optionally and preferably involves actual testing with real players and/or teams of players in order to evaluate all training aspects, such as full cognitive skills coverage. All training data is preferably recorded, along with the subjective impressions of the trainees and/or their coaching staff. Following the analysis of these tests, Cognitive Simulator Design 102 and Training strategy 104 are re-evaluated.

Figure 2A:
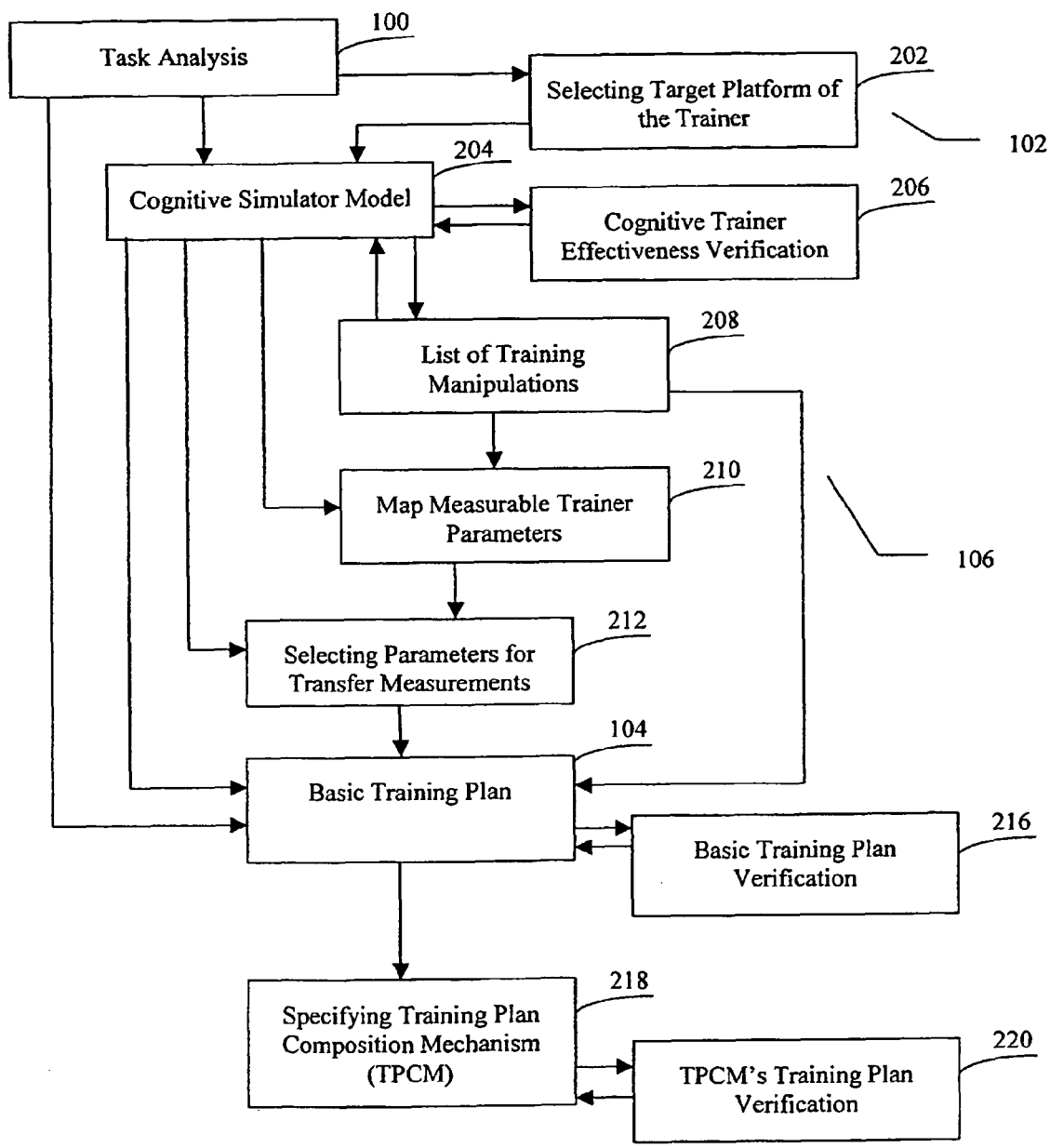
FIG. 2A illustrates stages 100 through 104 of the process of Cognitive Trainer Development of FIG. 1.

Referring now to FIG. 2A, additional stages optionally and preferably involved in development of the cognitive simulator of the present invention are shown. These stages may optionally and preferably be performed for stage 102, which is for design of the cognitive simulator (see FIG. 1). Stage 202 is preferably performed first, for selection of the platform for training the subject in the cognitive skills.

Stage 202 comprises selection of the platform on which Training System 10 will be developed. It should be noted that this stage may alternatively be performed prior to Task Analysis stage 100.

System 10 can be run on any computerized platform, such as a standard PC, a laptop computer, a PDA (Personal Digital Assistant), a wearable device, a toy-like electronic device, an interactive television, etc. The system is also not limited to particular input and output devices, but may use any standard input device, such as a standard keyboard, passive/active joystick, mouse, microphone (for a voice-activated game), game glove, touch pen, etc, and any standard output device, such as a screen, audio device (for example, loudspeakers or earphones), or any other type of device for providing touch-sensory feedback, including, but not limited to, any device providing vibrations, electric shocks, temperature changes, texture changes, surface geometry changes. Non-limiting examples include vibrating pointer devices, including but not limited to a vibrating computer mouse, vibrating or active joystick, etc.

The platform may optionally feature a plurality of hardware components controlled according to a plurality of instructions. For example, the platform may optionally be largely (if not entirely) mechanical in nature; alternatively and preferably, the platform may feature output devices such as screen displays, audio equipment for "displaying" audible sounds, headphones, loudspeakers, vibration output devices such as active joysticks, special chairs and so forth, which feature a combination of electronic and mechanical devices.

Stage 202 involves consideration of various aspects, such as the particular characteristics of the users, which may optionally include but are not limited to, age, physical abilities and skills, motivation, any disabilities or limitations, required support of the desired game dynamics, physical attributes of the sport and availability for end users. Optionally, stage 202 may be divided into two parts, such as mapping potential trainees and selecting the target platform. These aspects are preferably related to cognitive skills for developing the trainer, and also optionally are used to adjust the training plan (as described in greater detail below) for individual subjects and/or groups or teams of subjects.

Cognitive Simulator Design stage 102 and Task Analysis stage 100 form the basis for Cognitive Simulator Model 204.

As seen in FIG. 2A, following development of Cognitive Simulator Model 204, a Cognitive Simulator Effectiveness Verification stage 206 is performed, in order to ensure that the design meets the desired training goals. The design and verification stages are described in greater detail below, with reference to FIG. 4 wherein skills trained by Training System 10 are verified against the required cognitive skills, such that all the required cognitive skills are included.

When stage 102 has been completed, a list of training manipulations 208 is compiled. Training manipulations include variations in different aspects and dimensions of Cognitive Training System 10, including but not limited to, size of objects, velocity, feedback mechanism and channels, duration of training units, stimulus attributes and patterns of dynamic components (if present) or any other trainer components. Many other variations are possible; for example moving objects do not necessarily need to be presented on a display screen. Other examples include but are not limited to, changing tasks and emphasis, changing attributes of input or output characteristics, or changing the instructions. Each training manipulation or combination of manipulations has a known role in the training process. Each manipulation or combination of manipulations is aimed at stimulating a particular cognitive skill, or a combination of such skills. In addition, manipulations may be utilized for handling motivational aspects of the training process.

The list of training manipulations from stage 208 is used for the subsequent stages of Mapping Cognitive Simulator parameters in stage 210, and Selecting Parameters for Transfer Measurements in stage 212, as described in further detail below, in relation to FIG. 5 and FIG. 6, respectively.

The list of training manipulations from stage 208 also has a major role in devising the Basic Training strategy in stage 104, which is a detailed description of each training unit (such as session, meeting, block or round). This description includes components such as objectives, stimuli definition, manipulation variations, instructions, motivational guidelines, scoring policies, etc.

In order to ensure that Basic Training strategy 104 covers all aspects of training, Basic Training strategy Verification stage 216 is performed. Verification stage 216 mainly involves comparing the set of skills utilized in stage 107 with a list of required skills, as described below with reference to FIG. 4. If the respective sets of skills are found not to be equivalent, adjustments are made to Training strategy 104 and/or training plan from stage 107.

Training plan from stage 107 is a generic training plan, designed for training all athletes within a certain sports field or type of sports, and/or other types of tasks. Training plan 107 may be adapted for use in a specific situation, such as training of a particular player, team or game. This adaptation process requires Training strategy Composition Mechanism 218, comprising a set of definitions, benchmarks and rules, along with various sport-specific and personal data. Training plan 107 can be implemented manually or by automatic or semi-automatic means.

Optionally, the training plan may be determined by providing a plurality of cognitive building components to the coaching staff, which may for example be operated through the trainer; and composing the training plan from the plurality of cognitive building components. This embodiment may optionally form a cognitive toolbox for the coaching staff.

A Training strategy Composition Mechanism Verification from stage 220 is applied to Training strategy Composition Mechanism in stage 218 to ensure that the objectives of Training plan 107 are fully met.

Figure 2B:
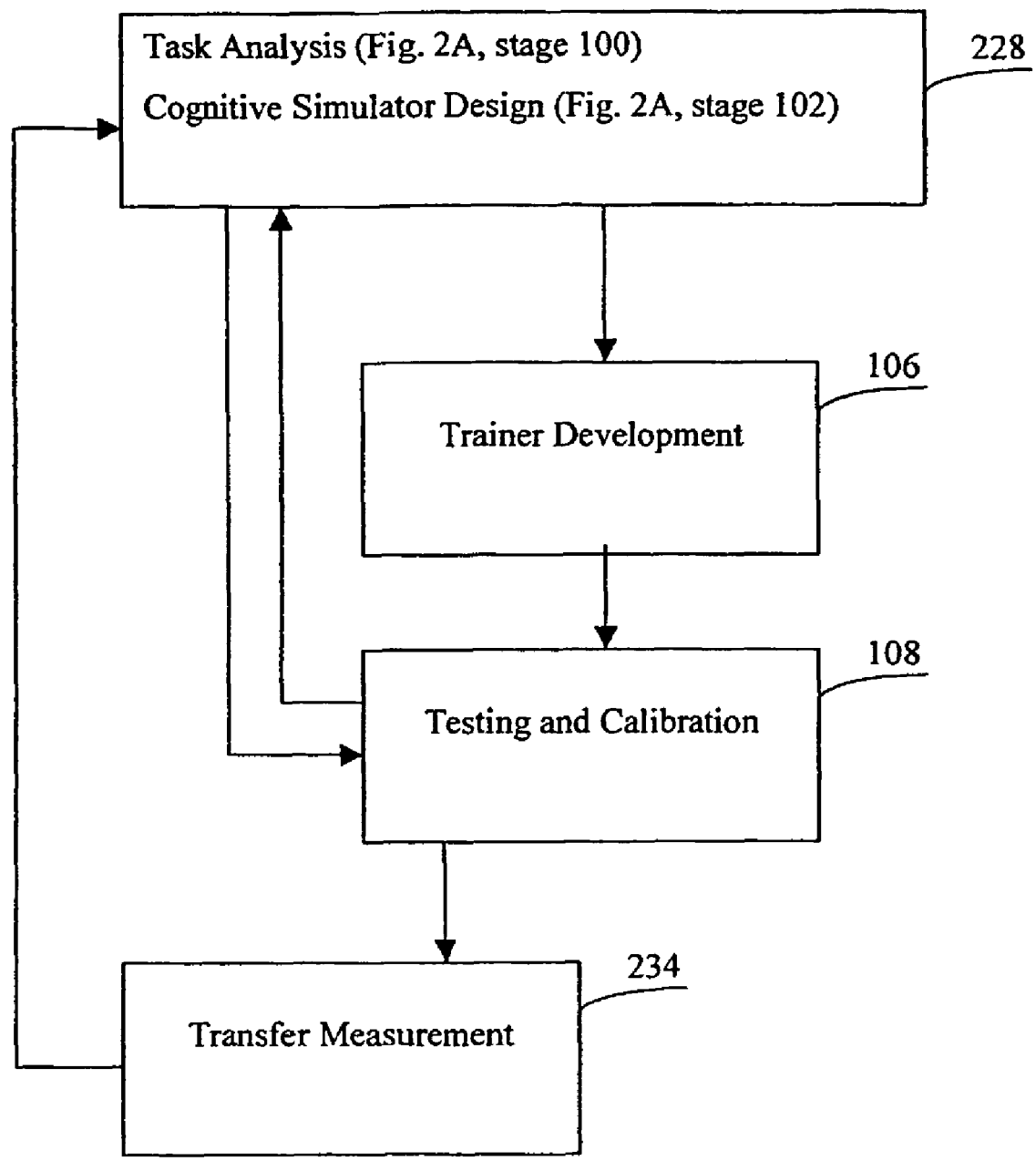
FIG. 2B illustrates stages 106 and 108 of the process of Cognitive Trainer Development of FIG. 1.

FIG. 2B further illustrates the stages involved in development of the system of the present invention for design of the cognitive simulator. Initial Design stage 228 comprises Task Analysis stage 100, Cognitive Simulator Design stage 102, and Training strategy 104. Initial design stage 228 precedes Trainer Development stage 106.

Stage 228 for initial design optionally and preferably comprises determining the training strategy with regard to coordinating a plurality of actions associated with the cognitive skills. Preferably, the cognitive skills that are to be trained are associated with a plurality of actions, which may optionally comprise a physical action and a cognitive action (and/or a combination of two or more of either type of action). More preferably, performance of the physical action does not require physical fidelity to a physical action performed with regard to the task itself; for example, for training a subject in cognitive skills related to basketball, the physical action determined as part of the training strategy is preferably not physically similar to a physical action performed during the game of basketball (or at least such similarity is not required).

These actions, preferably as physical and cognitive actions, that are part of the training plan are preferably coordinated, also as part of the training plan. For example, they may optionally be performed by the subject in sequences and/or combinations, and/or may also optionally be used to train for a plurality of cognitive skills simultaneously and/or in combination.

Optionally and more preferably, the training strategy also is determined by iteratively adjusting the plurality of actions which are then coordinated (the actions themselves and/or the coordination may optionally be adjusted). Most preferably, such adjustments are performed according to at least one heuristic parameter.

The system includes a Testing and Calibration stage 108, wherein parameters of Initial Design stage 228 and Trainer Development stage 230 are assessed. Adjustments to Initial Design stage 228 may be made as a result of Testing and Calibration stage 108.

Data from Testing and Calibration stage 108 is used as a basis for the stage of Transfer Measurement 234, whereby further adjustments may be made to Initial Design stage 228.

Figure 3:
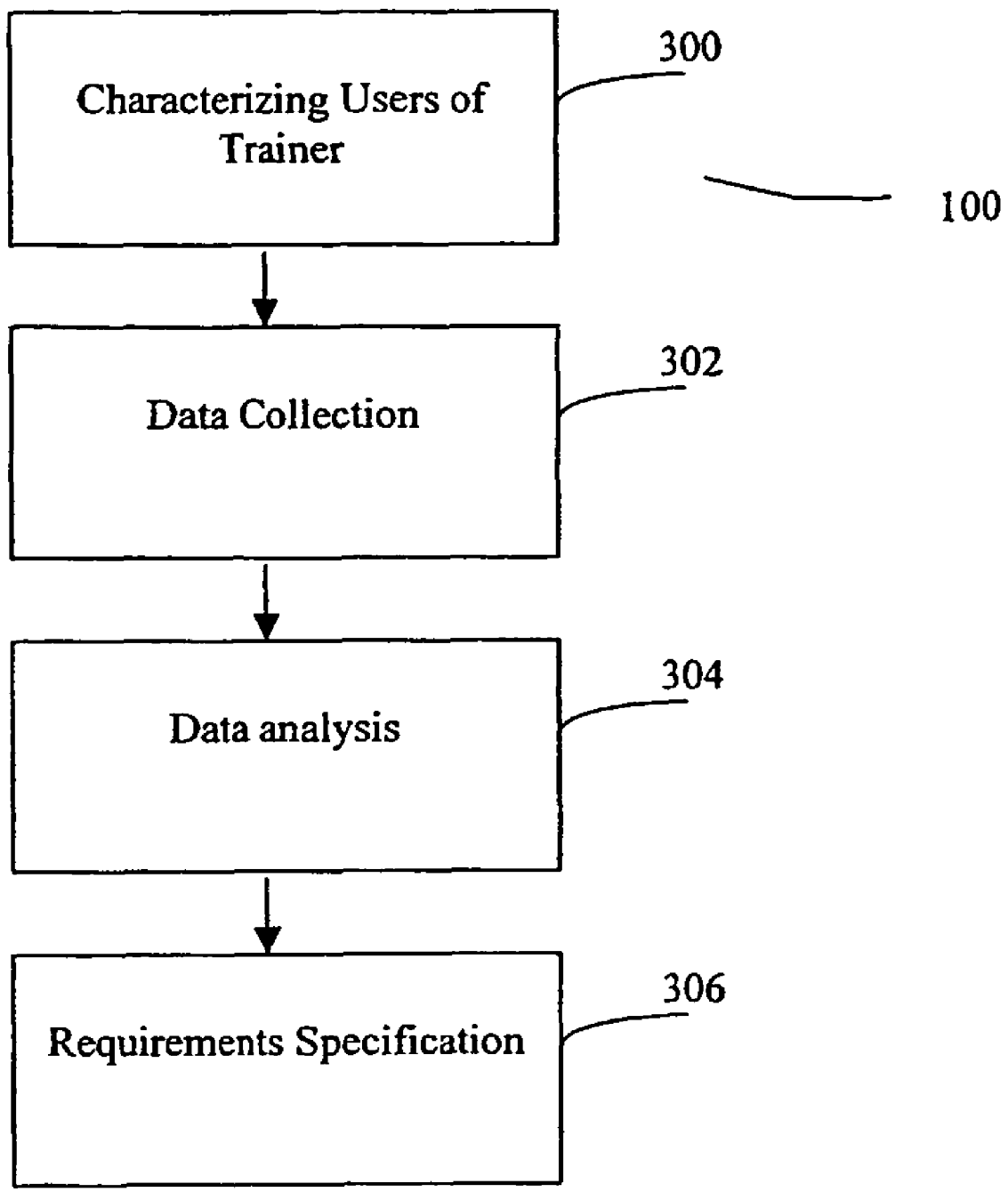
FIG. 3 further illustrates stage 100 of FIG. 1.

Referring now to FIG. 3, Task Analysis stage 100 is described in further detail with regard to the non-limiting illustrative example of basketball.

A preferred embodiment of the method of the present invention is described in the following non-limiting example for a cognitive training system for basketball.

Mapping of the relevant cognitive skills of basketball players is achieved by the known methodology of task analysis, analyzing the various roles, tasks and environment involved.

The first stage of Task Analysis 100 is that of User Characterization stage 300. This stage is aimed at defining future users of the system of the present invention. These may include players or coaches, wherein players may be further characterized as professional, college, High School, male, female, disabled, etc., and wherein coaches may characterized as head coaches, assistant coaches, team psychologists etc. The characteristics and attributes will vary between each group and sub-group.

User Characterization stage 300 is followed by Data Collection stage 302. This may involve collection of data from various sources, such as from observation of training sessions, interviews (such as with players, coaching staff, commentators or other experts), questionnaires, measurements (both on and off court), record of play, from an inventory of movement patterns and dynamics, or review of relevant literature.

Data collected in Data Collection stage 300 is then analyzed in Data Analysis stage 304. This may include analysis by defining real play scenarios, analyzing movements of real players in actual games, data mining, cluster analysis such as pattern analysis grouping, etc.

A conversion table is then drawn up, showing the connection between game activities and cognitive skills involved.

Stage 306 for Requirements Specification is also preferably performed, whereby the requirements of the Cognitive Trainer 10 are specified and assembled. This stage may optionally feature creation of a list of cognitive skills found to be involved in the specific sports activity. This should also include recommendations as to the implementation of the Trainer 10.

In the case of basketball players, five levels of task components can be identified, as described below. The boundaries between the levels are not well-defined and at least some of them may be seen as part of a continuum.

a. Basic Elements

These constitute the basic motor skills necessary for playing the game, such as running, jumping, throwing, catching, shooting, dribbling, dunking etc. Combinations of these components are also known, such as dribbling while running, shooting while jumping, etc.

The cognitive aspects of these skills involve perceptual processes and cognitive aspects of motor schema.

Perceptual Processes i. Location Perception

This includes perception of the locations of fellow players, and of the ball. Location perception training is based on aspects such as color, faces, heights and court spaces.

ii. Motion Perception

This includes perception of movement of other players, and of the ball. Motion perception training is based on direction and speed parameters.

iii. Prediction of Future Location

This requires the integration of location perception, motion perception and mental models of group plays and competitor's tactics. Additional variables such as acceleration must also be taken into account.

iv. Perception of Distance from the Basket

This is an aspect of distance perception based on horizontal and vertical dimensions.

v. Recognition of Free Team-Mates.

This requires relative location perception with regard to team-mates and opponents.

Motor Schemas

These comprise highly automated skills, requiring a low degree of concentration.

Divided vs. Focused Attention

Players generally perform individual motor processes with a high level of proficiency, whereas problems may arise when the performance of dual processes is required (running while dribbling, shooting while jumping, etc), necessitating attention to be divided between the two processes.

b. Short Procedures (Moves)

These are routines comprising several serial stages that constitute well-practiced procedures. Several players are generally involved, each having a specific role. The cognitive aspects that must be considered are as follows:

i. Procedural Knowledge.

Moves are procedures that may be learnt by repeated practice. Knowledge of the various moves increases with practice, such that a significant difference exists between novices and experienced players. Hence, novices must devote a high level of attention to correctly performing various move sequences, while experienced players require far less concentration, and can generally perform such practiced moves automatically, even under conditions of stress. Such moves performed by experienced players are known as habits or tendencies.

ii. Timing of Moves

Recognizing the exact moment at which a particular move should be performed is based on perception of the positions of teammates and opponents, and of the specific play taking place at the time. Timing of moves may be improved by training.

iii. Shot Selection

This aspect involves a decision regarding the exact shot to be used and the timing of the shot. This decision requires ability to recognize and select the relevant move for the particular situation.

Iv. Co-Ordination with Teammates

Most moves require the participation of more than one player. For example, in the 'pick and roll' move (basketball play) two players are involved, while other players adjust their location to support them.

V. Prediction of Future Location of Fellow Players vi. "Broken" Moves

Moves which the player is prevented from performing.

c. Play

These are the tactical components of the game. At the beginning of each play, the players are assigned to pre-defined areas and allocated specific roles and tasks. Each play may comprise a number of individual moves. There are two major categories of play: offensive and defensive. Each category may include many sub-categories.

The following cognitive aspects are involved:

i. Selection of the Appropriate Play

Each play in the game must first be selected by the coach. The selection is signaled to the playmaker, who in turn signals to other players. This decision is based on information gathered during the game and on current opponent status. Rapid decision-making is required.

ii. Translating Signals into Specific Play

Each play is signaled from the coach by use of a coded sign. In addition, some plays have variations which are also signed in a certain code. Players must translate each sign received into the specific move to which it relates, and must select the appropriate positions. This mental process initially requires high memory load, but with practice becomes almost automatic.

iii. Recognizing Sequence Location within the Play

Since each play is composed of several moves, the player must constantly recognize the current sequence position, compare game status with optimum status, and play accordingly. This task may require high level involvement of short-term memory.

iv. Overcoming Play Failure

Game status generally changes after initiation of each play, and players are required to adjust accordingly. This requires decision-making under pressure of time. Players generally follow their learned habits or tendencies under these circumstances, rather than making controlled decisions.

v. Task Switching

During the game, the teams constantly switch between defensive and offensive plays, and between various plays. These switches require control processes in order to adjust to the new task and the new role. The ability to switch efficiently between tasks is a critical factor in order to gain the correct position before an opponent. This is especially true in high-speed games.

vi. Role Switching

Most players must play different roles in different plays and games. Hence, the ability to switch between various roles is critical.

d. Game Tactics

Prior to each game the scouting team provides information about the opposing team. Based on this information, an overall tactic is formulated for the game. This tactic will dictate the general style of play in the game, including the main plays to be used, opponents to whom special attention must be paid, etc. Prior to the game, the coach may introduce new or special plays that have not yet become part of the repertoire of the team or are not well known to the team, for example in the case of opponents' plays.

Cognitive aspects of game tactics are as follows:

i. Information Gathering and Processing

This task is mainly the responsibility of the coaching team. The game style and tactics of the opposing team must be analyzed, based on information gathered from previous games.

ii. Decisions Regarding Tactics

The coach must make decisions regarding tactics to be used based on available information. The selected tactics must be consistent with team philosophy and capabilities.

iii. Learning New Plays

Players may sometimes have to learn new plays which are not part of their normal repertoire, in accordance with the selected tactics. These tactics will therefore not be well-practiced which may cause a strain on the players.

e. Game Philosophy

Each coach has his or her own game philosophy, developed through years of experience. The coach develops his own plays, and selects players in accordance with this philosophy. Training procedures are based on this philosophy.

Cognitive aspects of game philosophy are as follows:

i. Developing game philosophy ii. Creating plays consistent with game philosophy iii. Adjusting philosophy according to players' capabilities

SUMMARY OF COGNITIVE SKILLS

Based on the above analysis, the main cognitive skills found to be relevant to basketball players are listed. It should be noted that some of these cognitive skills are "control skills" while other are "basic cognitive skills":

a. Status recognition/situation awareness b. Information integration c. Spatial information processing d. Pattern recognition e. Task switching f. Stop-Restart actions g. Peripheral vision It should be noted that in this respect, the coach is perceived as a member of the team, such that the term 'player' includes the coach.

Figure 4:
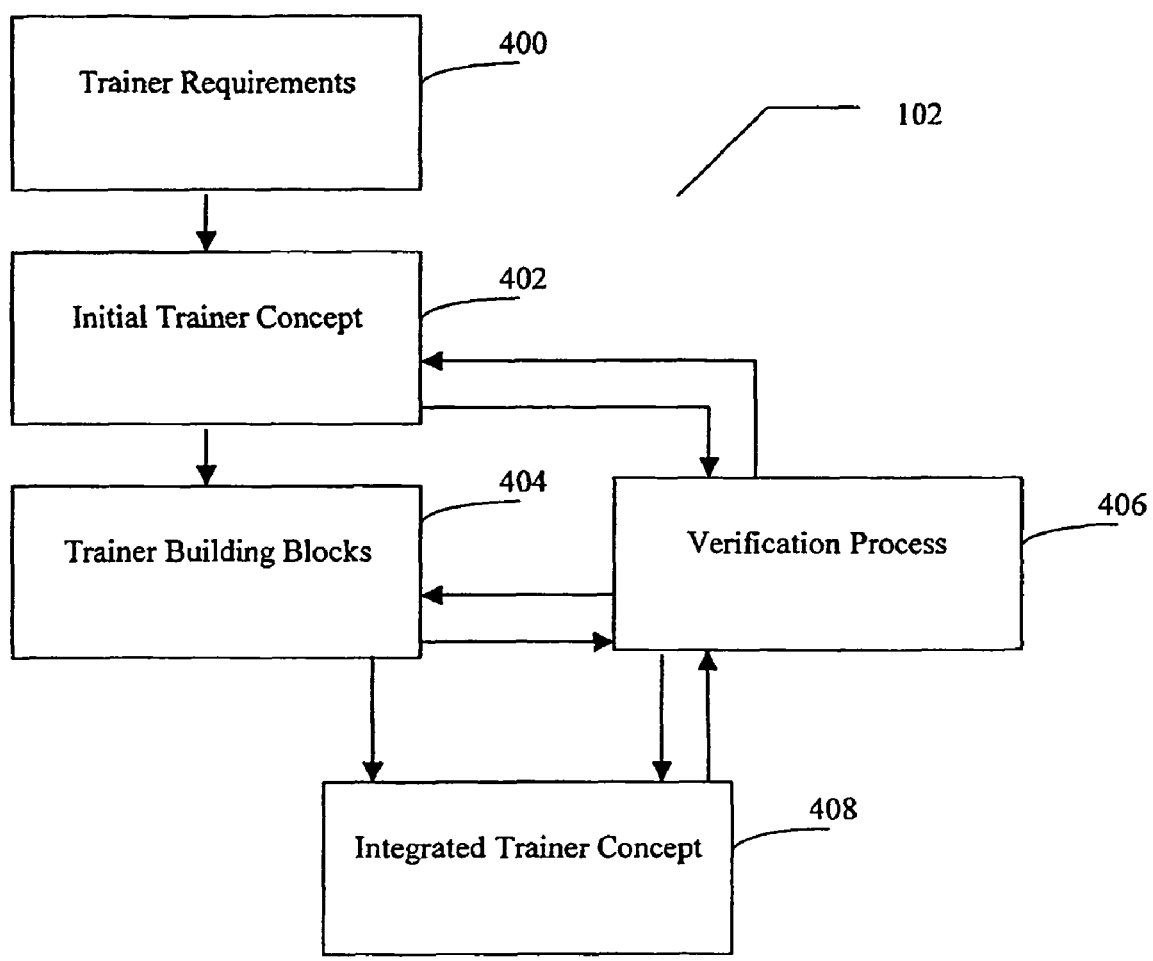
FIG. 4 further illustrates stage 102 of FIG. 1.

FIG. 4 shows in greater detail the stage of Cognitive Simulator design 102 of FIGS. 1 and 2A. Trainer Requirement stage 400 utilizes input from Task Analysis stage 100, in order to define Initial Trainer Concept 402, comprising the main objects and dynamics of the game used in Training system 10.

Trainer Building Blocks 404 are then defined for the game, which includes definition of behavior and rules for each building block 404, and defining scoring paradigms for each building block 404.

Verification Process 406 is then carried out, wherein building blocks 404 are verified against the required cognitive skills, such that all the required cognitive skills are included.

Integration Stage 408 is performed in order to obtain a "logical bug-free", interesting and challenging game. The output of Integration Stage 408 is basically a "conversion table" between cognitive skills and game components.

Figure 5:
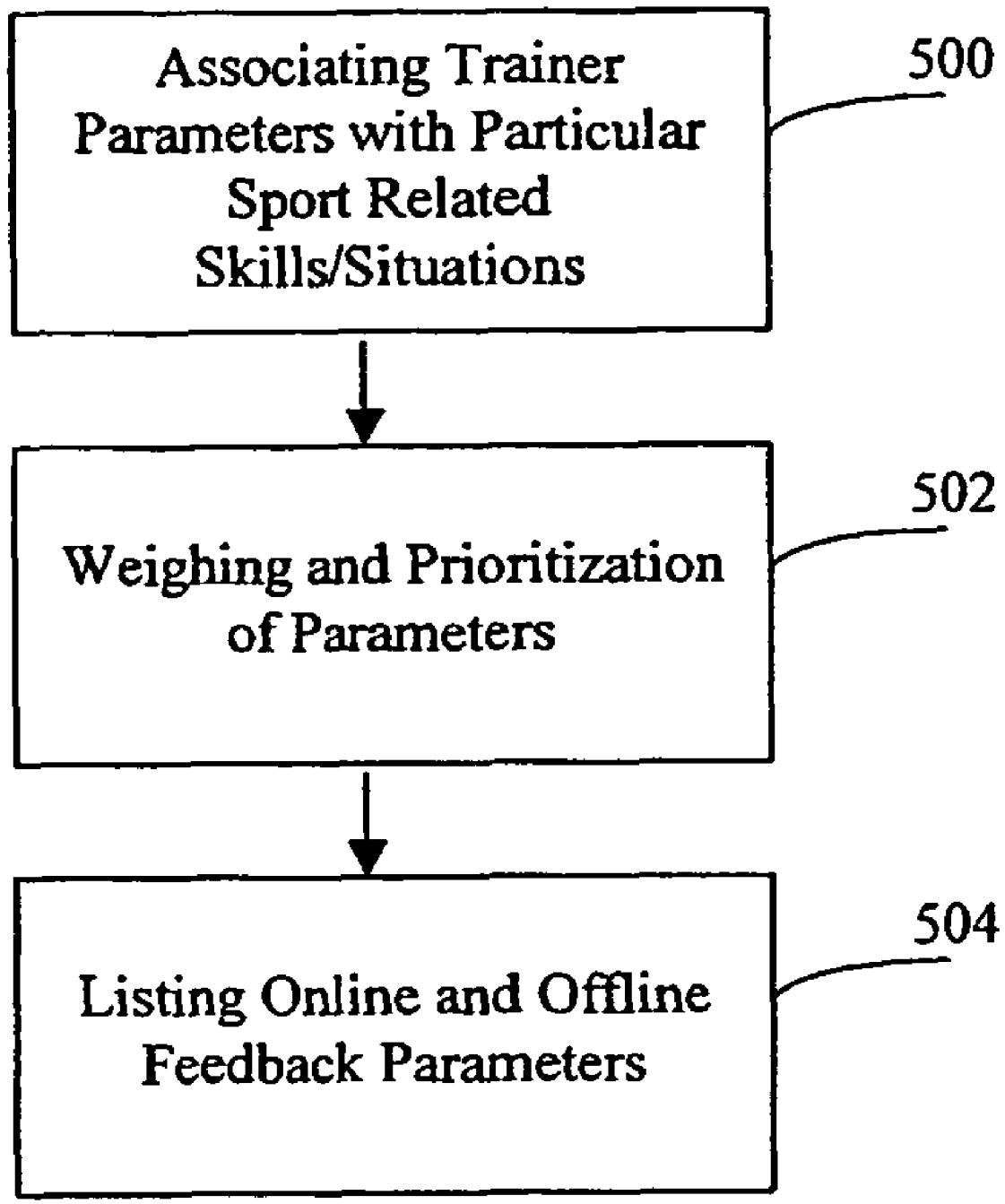
FIG. 5 illustrates stage 210 of FIG. 2A.

FIG. 5 shows in greater detail the Mapping of Measurable Trainer Parameters stage 210 of FIG. 2A. The first stage is that of Mapping Trainer Parameters to Particular Sport-related Skills or Situations 500, which utilizes real-life parameters. This is followed by Selection of Weight and Prioritization of Parameters 502, wherein the most important skills with respect to the particular sport are selected. Listing of Online and Offline Feedback Parameters 504 is then performed, wherein parameters for use in online and offline feedback are defined.

Figure 6:
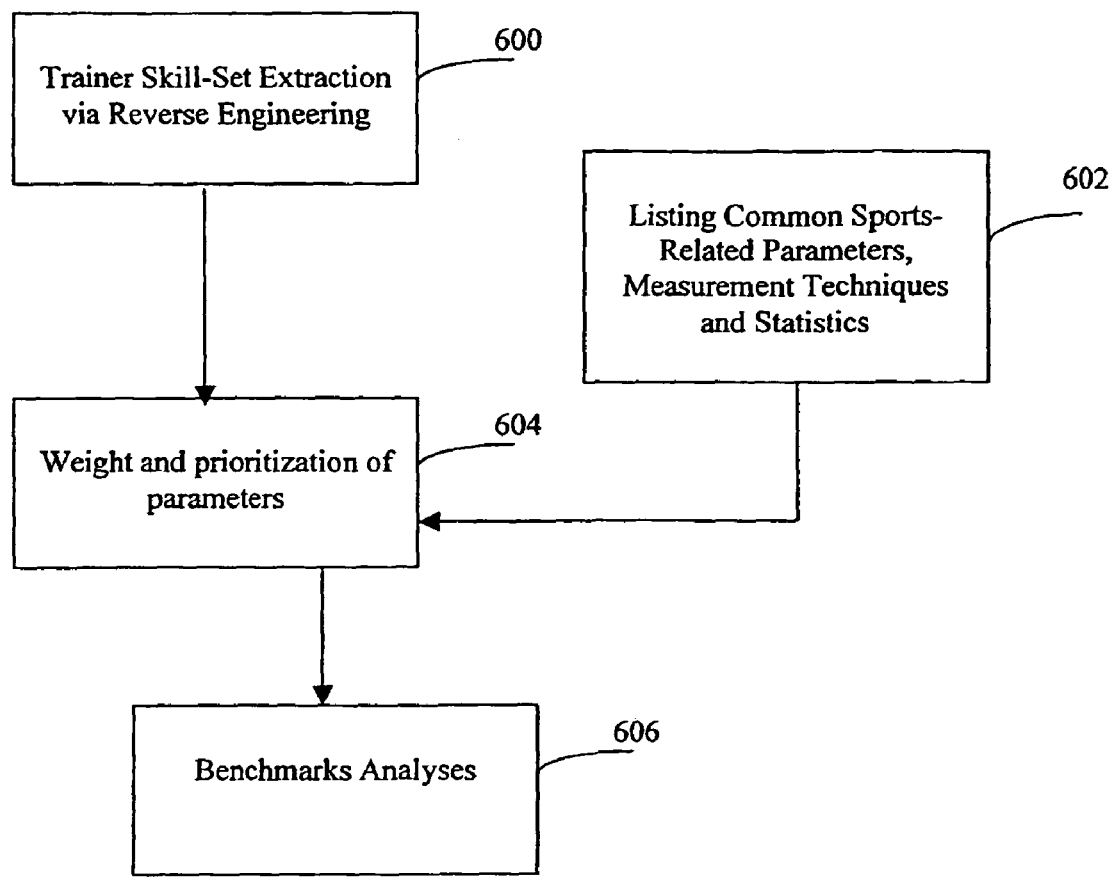
FIG. 6 illustrates stage 212 of FIG. 2A.

FIG. 6 shows the Selection of Parameters for Transfer Measurements stage 212 of FIG. 2A. Trainer Skill-Set Extraction via Reverse Engineering stage 600 is applied by analyzing conversion tables to establish which real-life game parameters are expected to be changed as a result of cognitive training.

Stage 602 of Listing Common Sports-related Parameters, Measurement Techniques and Statistics selects the basketballs skills and situations which are most related to cognitive skills. Parameters which are unique for specific skills and situations are listed, and parameters defined based on existing parameters. Weighting and prioritization of parameters obtained in stages 600 and 602 is carried out in stage 604, followed by Benchmark Analyses 606, which provides a definition of indices for comparison to the future performances of players and teams.

Figure 7:
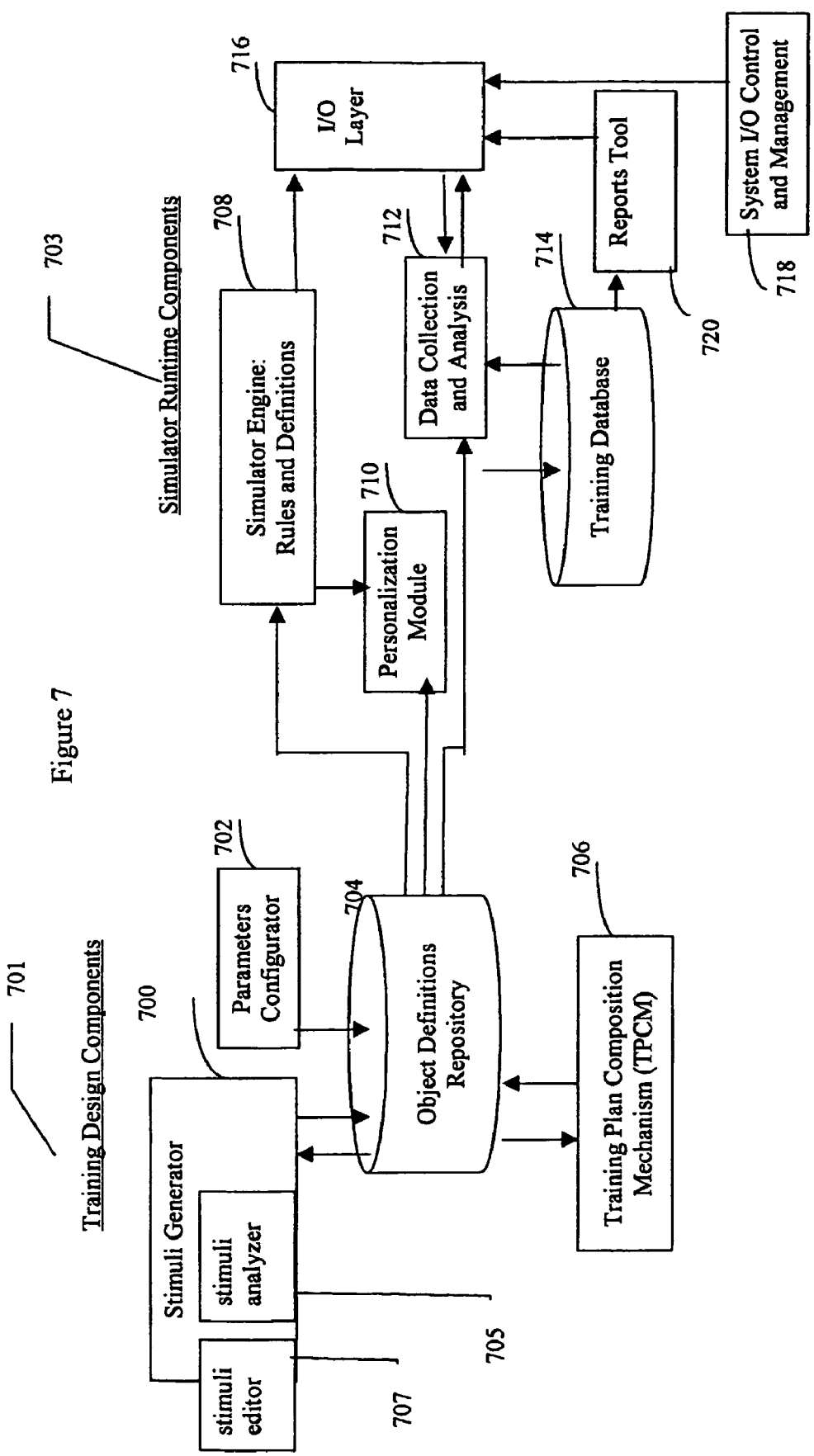
FIG. 7 illustrates the Trainer Architecture, step 230 of FIG. 2B.

Referring now to FIG. 7, Trainer Development stage 106 of FIG. 2B is shown in greater detail as a non-limiting, illustrative example of the present invention. Stage 106 may optionally and preferably be divided into two substages: development of training design components 701 and development of simulator runtime components 703. Training design components 701 are used primarily by training staff, such as researchers or cognitive coaching staff of a sports team. Runtime components 703 are used primarily by the trainees and their supervisors, such as the head coach. Optionally, Trainer Development stage 230 may involve only development of training design components 701, with design components being predefined.

Design components 701 comprise stimuli generator 700, parameter configurator 702, object definitions repository 704 and training plan composition mechanism 706.

Stimuli generator 700 enables now valid stimuli to be produced. Such stimuli optionally and preferably involve object movement, dynamics and additional factors such as speed, size and duration. Each stimulus conforms to a set of definitions and rules that are stored in the objects definition repository 704, as described below.

Production of new stimuli may be achieved manually, semi-automatically or automatically. In the manual mode, all the attributes are entered manually, in the automatic mode stimuli attributes are generated at random, while semi-automatic mode uses a combination of manually entered and randomly generated attributes.

Stimuli generator 700 comprises two major components, the stimuli editor 705 and the stimuli analyzer 707. Stimuli editor 705 supports both manually entered and randomly generated data entry, or a combination of both. Entry of exact attributes is required, (for example, object X speed=100), or attribute range (e.g. object X speed=100-150).

Stimuli analyzer 707 preferably runs each new stimulus and calculates various parameters, such as difficulty level, richness or complexity of stimulus, or the distribution of particular events along the stimulus (the number of cognitive events to which the subject must react). These calculated attributes are then compared to the definitions and rules stored in objects definition repository 704, and the outcome reported. These definitions and rules are preferably the benchmarks, or standards against which the attributes of the behavior of the subject are calculated. Each parameter entered via the stimuli analyzer is validated.

Parameter configurator 702 supports the process of entering and analyzing data stored in objects definition repository 704. While the stimuli generator supports the production of new stimuli, parameter configurator 702 presents statistics regarding groups of stimuli and enables various parameters of new stimuli sets to be established. Thus, for example, when reviewing the 'duration' attribute, parameter configurator 702 presents the distribution of the duration of training units for all the required stimuli contained in the repository, and enables a new set of stimuli to be defined, having duration of a certain value or range of values.

Parameter configurator 702 also handles rules applicable to the training program, such as the graduation of difficulty levels within a training session, or the number of rounds comprising each training unit. Each parameter entered via parameter configurator 702 is validated.

Object definitions repository 704 stores all definitions and attributes entered by stimuli generator 700 and parameter configurator 702. Access to repository 704 may optionally be selectively restricted, for example by permitting access of research staff to all data contained within repository 704, while allowing coaching staff access only to data associated with the team.

Training plan composition mechanism 706 is the implementation of step 218 of FIG. 2A, specifying of training plan composition mechanism. Mechanism 706 controls and generates new training units and plans, which may optionally and preferably be customized, such as for individual teams, game drills, players, positions, offence, defense etc.

Simulator runtime components 703 comprise simulator engine 708, personalization module 710, data collection and analysis unit 712, training database 714, I/O (input/output) layer 716, system I/O control and management 718, and reports tool 720.

Simulator engine 708 produces the actual simulation in real-time. It integrates the rules and definitions of the training plan in simulator engine 708, the attributes of the particular player or team from personalization module 710, and the relevant components from object definitions repository 704. The output is sent to I/O layer 716.

Simulator engine 708 controls the sequence and content of events of the simulated environments, as well as the general look and feel of the application. Using a standard command method, such as a dedicated scripting language, all components and events are planned and handled.

Training plan rules and definitions can optionally and preferably be assembled in labeled components, thus enabling simulator engine 708 to be controlled to various levels of hierarchy and precision. Thus, for example, in the case of a basketball training system, simulator engine 708 can execute a high level command such as 'run mental rotation training X' or 'run defense Y training', or a low level command such as 'run stimulus Z for player M in sequence a, b, c'.

Personalization module 710 contains data regarding individual trainees, including personal attributes, up-to-date scores, characteristics and calculated parameters of previous training sessions. Personal training plans are based on this data.

Data collection and analysis tool 712 records data logged during a training session to training database 714, which stores all data. Logged data, recorded at frequent intervals, contains the status of the training program and the response of the trainee. This data enables online and offline feedback, further analysis of the training process, and a replay of the game for review purposes. Such a reconstruction of the training session enables more complex analysis, such as strategy tracking.

Data stored in training base 714 may be further used for external statistical and data mining applications, such as SAS, and/or selected, integrated modules of such external applications and/or proprietary statistical modules and algorithms.

I/O (input/output) layer 716 presents the trainer environment and stimuli to the trainee and/or coach or coaching staff, by control of various types of input and output devices, which may optionally include at least one of a keyboard, game controller (such as a joystick), mouse, wearable controller, PC or TV screen, wearable sensory device, speakers or earphones.

I/O layer 716 may also optionally include physical measurement recording devices, such as an EEG (electroencephalogram), GSR (galvanic skin response), EMG (electro myogram), pulse meter, ECG (electrocardiogram), blood pressure monitor, EOG (electro oculogram), functional MRI (magnetic resonance imaging), head movement monitor, or accelerometer.

System I/O control and management device 718 enables the training administrator to monitor and control the training in real time. Utilities such as ClassNet can be used to observe each of the output devices.

Reports tool 720 generates reports and analyses based on the data stored in training database 714. This report tool may optionally use one or more statistical packages and routines.

Figure 8:
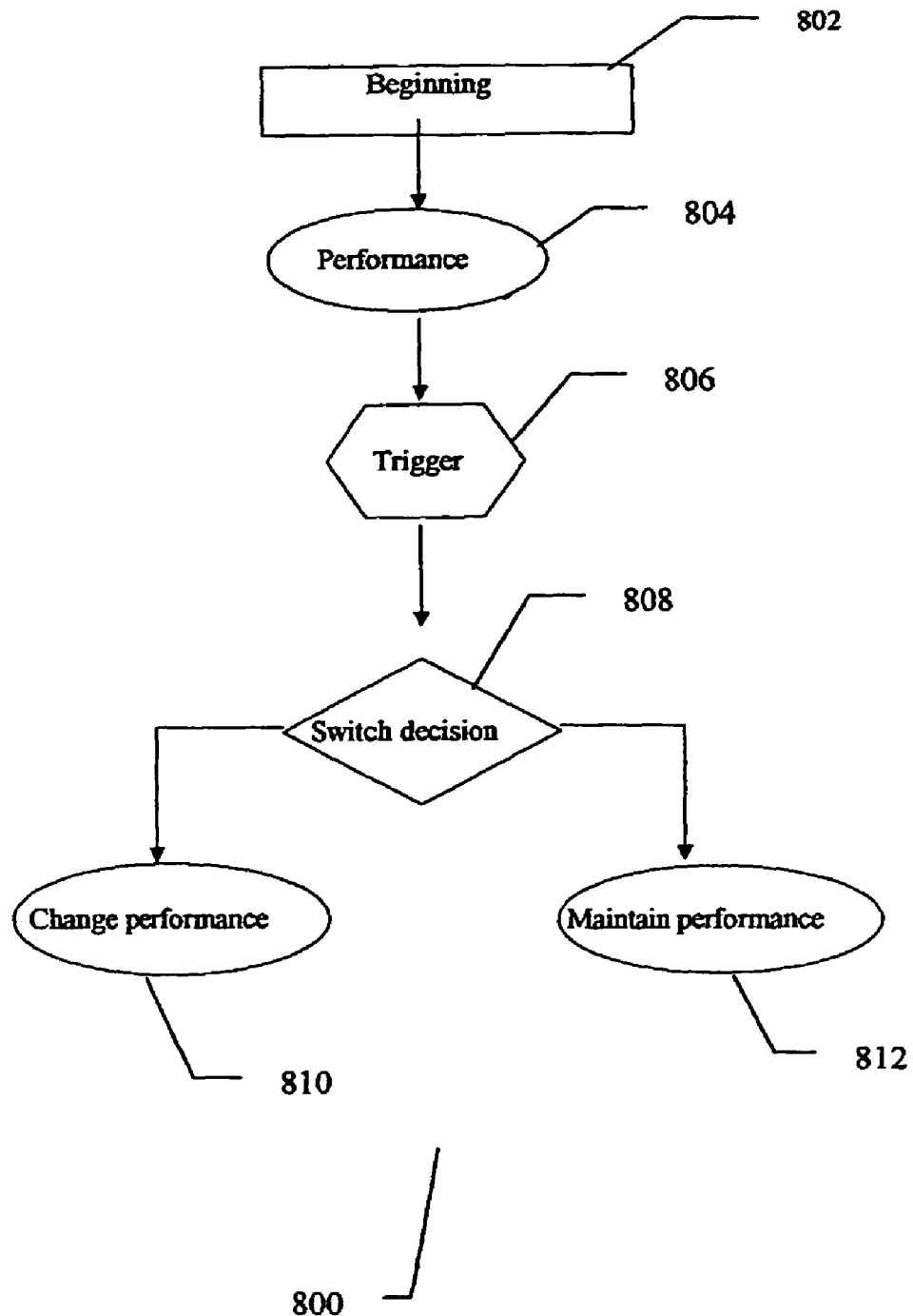
FIG. 8 is an embodiment of the Cognitive Trainer Development process of FIG. 1 applied to a switch model task for a basketball player.

FIG. 8 shows a non-limiting, illustrative model 800 of the system of the present invention for use in enhancing the task-switching skill of a basketball player, or any other suitable cognitive skill for the basketball player.

Model 800 begins at stage 802. The following task-switch components are preferably taken into consideration in design of the trainer for model 800:

a. Performance 804 prior to switch. It is assumed that the team would benefit from optimal performance prior to switch. Optionally, in a basketball game, the pre-switch task exists as part of the "Play" itself.

b. The trigger 806 for the switch. This should include consideration of whether the switch is planned or sudden. A planned switch may constitute part of a sequence, while a sudden switch usually results from a failure in a move or play, or unexpected response of the opponent. The player may be better prepared prior to a planned switch, and will have to overcome failure and surprise in the case of a sudden switch.

Switch trigger 806 may be based on either an internal or an external trigger. An internal trigger would be based on a personal perception that the current situation requires switch decision. An external trigger would result from the decision of another person, such as a coach or playmaker, regarding a switch.

Spatial and vocal triggers should also preferably be considered. A spatial trigger is the identification of a spatial pattern that requires switch, such as a free path, blockage, certain spatial arrangement of players, etc. A vocal trigger is a call from a team mate or coach to change a move. A temporal trigger is awareness of the time left in the game, which is especially important during the last few seconds of the game. The spatial trigger is considered the most critical for training, followed by the temporal trigger.

Switch decision 808 depends on the available set of play and move alternatives and on the alternative dominancy of the individual player.

Alternative dominancy relates to certain habits or tendencies of a player that is more dominant than others. When placed in a decision-switch situation, under pressure, a player will tend to select the dominant alternative, which may not necessarily be the most appropriate one.

If the switch were part of a play, the players would have a set of alternatives ready. If the switch is sudden, the player will have to create the appropriate set of alternatives. It is believed that in each decision situation, a player is capable of considering up to a maximum of five alternatives.

Other factors which are preferably considered when designing a model for a switch decision include speed versus accuracy and possession of ball. The player in possession of the ball is required to make a decision, while other players usually wait to see the decision made before switching. Ideally, the player should be able to make switch decisions even when not in possession of the ball. Such decisions may be the most crucial for the play.

The result of switch decision 808 is that one of two options is selected: the decision 810 to change the performance occurring before trigger 806, or decision 812 to maintain performance 804 occurring before trigger 806.

The computer game-like interface that is optionally and preferably used in the training system 10 of the present invention optionally and preferably has the following requirement specifications 306 in order to train the required cognitive skill. It should be noted that these are illustrative in nature and are not intended to restrict the scope of the present invention in any way.

A. Task Requirements
 a. Spatial in nature
 b. Several tasks presented to induce selection of alternatives
 c. High-speed tasks
 d. Tasks that allow error to occur and entail speed/accuracy trade-off
 e. Tasks that allow fast learning
 f. Each goal can be achieved in several ways
 g. All tasks are integrated
 h. Switch will not be between different input devices but between control procedures
 i. Tasks should avoid as much as possible the influence of existing game considerations
 j. Some of the tasks should be performable either with or without object (flag, ball, token, etc.)
 k. Most game situations should allow several alternatives to take place
 l. Switch clues should be either explicit (switch instructions) or implicit (situation change).

B. Training Requirements
 a. Provide sufficient initial training with basic tasks.
 b. Tendency creation. At least part of the task should become highly trained, to an almost asymptotic level of performance.
 c. Learning how to differentiate between situations.
 d. Reward based on decision time.
 e. Initial training with explicit switch instructions
 f. Four switch training conditions: single task (basic performance); explicit switch; implicit switch; and mixed explicit/implicit switch.
 g. Two training conditions based on sets of alternatives: selection from a set of pre-defined alternatives or provision of own alternatives.
 h. Three conditions based on dominant task relevance: dominant task is most appropriate; dominant task in not appropriate; dominant task is prohibited.
 i. Tasks should be differentiated by dominancy.
 j. Strategy of using several alternatives should be supported.
 k. Selections should be rewarded based on their result.

C. Training Environment
 a. Competitive environment
 b. High time-pressure
 c. High noise level Based on the above-listed requirements, a game-like computerized trainer is preferably designed, based on an imaginary task metaphor. This metaphor might change with the development of the game, and might affect the graphic representation of the game, without changing the essence of the trainer. Thus, basic rules and behaviors remain constant.

Figure 9:
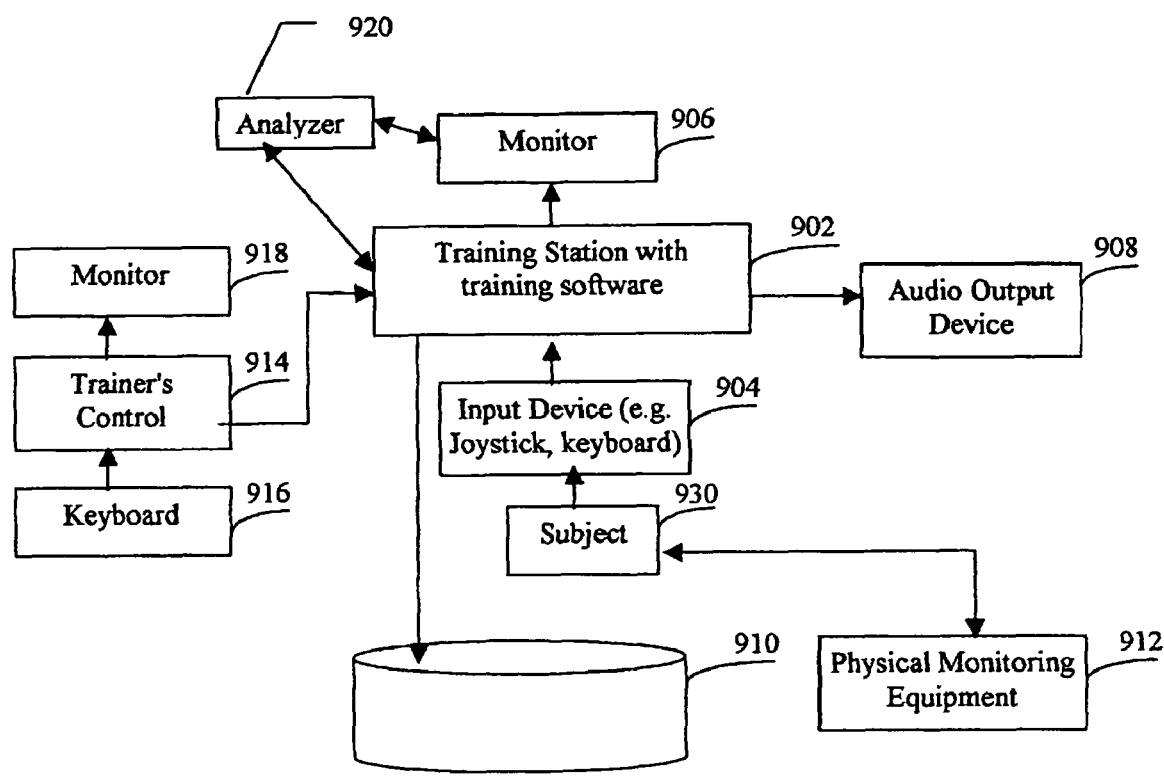
FIG. 9 is an embodiment of the Training System of the present invention.

FIG. 9 shows a general design for a training system 900. Training system 900 optionally and preferably comprises a training station 902, a monitor 906, a training database 910, and an analyzer 920.

Training station 902 optionally and preferably comprises a training computer provided with training software, however, optionally an embedded computer or electronic or mechanic mechanism may also be used as well, alone or in combination for implementing the cognitive training program, wherein training is divided into training sessions and training tasks. Each subject 930 is presented with a specific program according to his profile and training record.

Optionally, training module 902 comprises at least two training computers, such that at least two subjects can 'play' against one another.

Training database 910 maintains performance records of individual subjects. Using this data, training station 902 automatically (or optionally semi-automatically or manually) assigns the appropriate tasks and levels of difficulty to the subject.

Optionally and preferably, training system 900 further comprises trainer's controls 914, which provide an external modulation system by which the training session can be monitored and controlled manually in real-time by an operator. Trainer's controls 914 optionally and preferably comprise a monitor 918 and a keyboard 916 to enable detailed training definitions to be given.

Monitor 906 presents the subject with the training tasks. A plurality of monitors 906 may optionally be used to create wide-angle stimuli.

Analyzer 920 received input from training station 902 relating to interactions of subject 930 with the training computer in response to tasks presented by monitor 906, and provides feedback for adjustment of subsequent tasks presented by monitor 906. Analyzer 920 may preferably and optionally also receive input data from training database 910.

Subject 930 is optionally and preferably provided with at least an input device 904 for use in reacting to and executing the training tasks presented by monitor 906. Input device 904 may optionally and preferably include at least a joystick and a customized keyboard.

The training system 900 of the present invention may also optionally include physical monitoring equipment 912, such as devices for measuring blood pressure, heart rate, and skin humidity of the subject. The system may also optionally comprise an audio output device 908 such as loudspeakers or headphones to provide audio stimuli throughout the training session. Audio output device 908 may comprise audio triggers, feedback and distracting noises.

Figure 10:
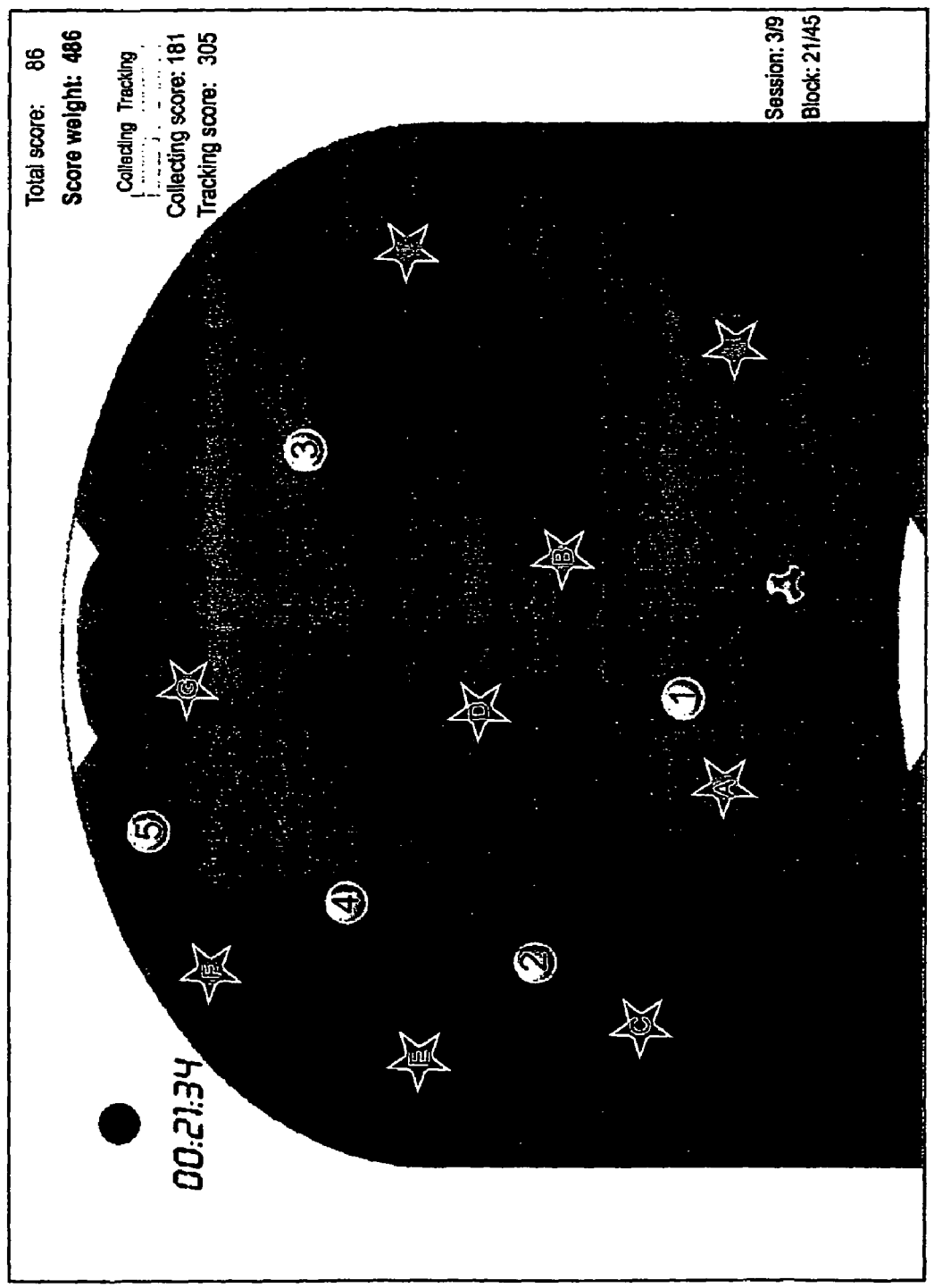
FIG. 10 is a Cognitive Training System, constructed and operated in accordance with the principles of the present invention.

FIG. 10 shows an embodiment of the present invention, comprising a game. Game comprises the following representational components on a screen: a court located at the centre of screen, a home base located at the bottom centre of court, a space station located at top centre of court, a plurality of asteroids and space apples, and a space shuttle.

The screen optionally and preferably displays the following information:

Time count clock, displaying elapsed time, which changes every 100 ms, over a specified range. The maximum time allowed may optionally be varied, and is preferably selected according to the manipulation required and the cognitive skill being trained.

Total score is also preferably displayed.

The collection score is preferably displayed and updated for every collected apple.

Tracking score for tracking moving objects is updated periodically, for example every second. This may optionally be implemented as an analog display.

A green light to allow departure of the space shuttle may optionally be displayed.

Apple disappears when 'picked'. In addition, an audio signal may be sounded.

A written message or other visual indication may optionally be displayed on the screen to indicate an explicit switch message, which may also be accompanied by an audio tone.

In addition, audio information may be provided to the player as follows:

An audio signal may optionally indicate start of a block or training period and allows progress selection (for example, manual level selection by the subject).

An audio signal indicates expiry of block time.

An audio signal indicates expiry of selection time.

The number of asteroids is preferably 5 or less, and their positions are for example in accordance with a set of pre-recorded x/y co-ordinates in an ASCII file, which may change every t seconds, where t=speed of each ASCII line input read. The appearance of asteroids may be varied by use of different Gifs. An asteroid may be visible or invisible. Each asteroid type is determined by the ASCII format file and can be changed from line to line. If an asteroid hits the shuttle, it passes through it. Movement and behavior logic of asteroids are not required. A "write" utility is built in order to allow the feeding of the relevant parameters into the ASCII file The number of space apples is preferably 7 or less, positioned according to a set of x/y co-ordinates. Space apples are similar to asteroids, but without movement, such that no ASCII file parameters or programming are required, and when crossed by the shuttle, space apples disappear.

The space shuttle is initially situated at home base, and is moved by a control joystick. Speed of travel of the shuttle is proportional to movement of the joystick.

The primary game task is to bring the space shuttle from home base in the shortest possible time, while collecting all space apples. Based on the location and movement of asteroids, the user will control the movement of space shuttle, and will be allowed to perform one of four maneuvers:
  a. Ride an asteroid (shuttle moves with asteroid) (for example, tracking movement of an object)
  b. Remain between asteroid and space station (judging movement of two or more moving objects)
  c. Lead an asteroid (requiring forecasting of movement of asteroids)
  d. Remain between two asteroids (tracking the midpoint of movements of two moving objects).

Free travel will be possible only for short time periods in order to pick space apples.

The game includes the following controls:
  a. A joystick, controlling space shuttle. This is a first order control. Optionally, tactile feedback may be included when an inappropriate maneuver is made, and/or sound effects to signal selection of a wrong maneuver.
  b. Numbered keys, controlling selection of asteroids. These record the leading asteroid and record timing of selection.
  c. Four assigned keys, for selection of progress mechanism (determination of level of difficulty). These record progress mechanism and record timing of selection.

The user may be required to change maneuvers or perform a different task in response to the following indications:
  a. Block-beginning instructions. This requires selection and maneuvering of the leading asteroid i.e the user selects a particular maneuver (ride/lead, etc.) and selects the asteroid on which this maneuver is to be performed. The availability of maneuvers is based on the pattern of asteroids. The user must wait until a green light indicator is displayed before commencing movement of asteroid.
  b. Explicit switch message, which requires selection of the leading asteroid and maneuver within a predefined time period.
  c. Relative change of all asteroids, which requires change of the leading asteroid and maneuver within a predefined time period.

Parameters in the system may also optionally include but are not limited to timing parameters, accuracy parameters, scoring parameters, object parameters, and maneuver parameters. Parameters that are global across all sessions will be determined in the game settings ASCII file. Parameters that are line/event/block specific will be determined in the session specific table. All parameters are preferably editable by researchers or managers and not hard coded.

Output requirements for calculation of scores and monitoring of user performances are preferably determined, including raw output data as well as output based on calculations.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

REFERENCES

1. Armony, L. and Gopher D. Generality of Control Processes in Task Switching. Ph.D. dissertation. *Industrial Engineering and Management, Technion*, 2002.
2. Ball, K., Beard, B., Roenker, D., Miller, R., and Griggs, D. Age and visual search: Expanding the useful field of view. *Journal of the Optical Society of America*, 1988. 5: 2210-2219.
3. Dennis K. A., and Harris, D. Computer based simulation as an adjunct to Ab Initio flight training. *The International Journal of Aviation Psychology*, 1998. 8(3): 261-277.
4. Gopher D., Armony, L., and Greenshpan, Y. Switching tasks and attention policies. *Journal of Experimental Psychology—General*, 2000. V. 129(3), 308-339.
5. Gopher, D., Weil, M., and Bareket, T. Transfer of skill from a computer game trainer to flight. *Human Factors*, 1994. 36, 387-40.
6. Kramer A. F., Larish J. F., and Strayer D. L. Training for Attentional Control in Dual Task Settings: A Comparison of Young and Old Adults. 1995. *Journal of Experimental Psychology: Applied*, vol. 1, 50-76.
7. Ortiz, G. A. Effectiveness of PC-based flight simulation. *The International Journal of Aviation Psychology*, 1994. 4: 285-291.
8. Phillips, S. I., Hulin, C. L., and Lamermayer, P. J. Uses of part-task trainers in instrument flight training. In R. Jensen (Ed.), 1993. *Proceedings of the 7th international symposium on Aviation Psychology* (pp. 743-746). Columbus: the Ohio State University.

What is claimed is:

1. A method for training a subject for control processes in a task, comprising: decomposing the task into a plurality of cognitive skills related to the control processes; determining a training strategy according to said plurality of cognitive skills; and constructing a trainer, said trainer comprising software operated by a computer for training the subject according to said training strategy, wherein operation of said trainer does not require any physical fidelity to the task, wherein the control process is selected from the group consisting of one or more of executive or attention control processes; wherein the task comprises a sport-related activity; and wherein said software for training the subject provides a plurality of stimuli that are not identical to stimuli received by the subject during performance of the task.

2. The method of claim 1, wherein said trainer uses at least one physical action being different from an actual physical action performed by the subject when performing the task.

3. The method of claim 1, wherein said decomposing the task into said plurality of cognitive skills further comprises: decomposing the task into a plurality of actions; and mapping said plurality of actions to said plurality of cognitive skills.

4. The method of claim 3, wherein said mapping further comprises: analyzing said plurality of actions to determine a plurality of cognitive actions, wherein said cognitive actions are mapped to said plurality of cognitive skills.

5. The method of claim 1, wherein said determining said training strategy comprises: associating each cognitive skill with at least one action to be performed by the subject.

6. The method of claim 5, wherein said action in said training strategy further comprises a physical action and a cognitive action, wherein said physical action does not require complete physical fidelity to the task.

7. The method of claim 6, wherein said determining said training strategy further comprises: coordinating a plurality of actions associated with said cognitive skills.

8. The method of claim 7, wherein said determining said training strategy further comprises: iteratively adjusting said plurality of actions for said training strategy for said coordinating.

9. The method of claim 8, wherein said iteratively adjusting said plurality of actions is performed according to at least one heuristic parameter.

10. The method of claim 5, wherein said determining said training strategy further comprises: determining a sequence of actions to be performed by the subject for training each cognitive skill.

11. The method of claim 5, wherein said determining said training strategy further comprises: determining a sequence of actions to be performed by the subject for training a plurality of cognitive skills in combination.

12. The method of claim 1, wherein said determining said training strategy comprises determining at least one action to be performed by the subject and wherein said constructing said trainer comprises: selecting at least one input device and at least one output device for operation by the subject according to said at least one action to be performed by the subject.

13. The method of claim 1, wherein said decomposing the task further comprises: determining a plurality of basic skills related to the task; and combining these basic skills into a profile for training the subject.

14. The method of claim 1, further comprising determining a training plan for training the subject with said trainer.

15. The method of claim 14, wherein said determining said training plan further comprises associating at least one parameter for operation of said trainer by the subject with at least one task-related skill or situation.

16. The method of claim 15, wherein said determining said training plan further comprises assigning a weight to said at least one parameter.

17. The method of claim 15, wherein said determining said training plan further comprises mapping said at least one parameter to an interaction of the subject with said trainer.

18. The method of claim 17, wherein said constructing said trainer comprises: selecting at least one input device and at least one output device for operation by the subject according to said cognitive simulator.

19. The method of claim 18, further comprising: calibrating an operation of said trainer during interactions with the subject.

20. The method of claim 1, wherein said sport-related activity comprises an object-handling activity.

21. The method of claim 20, wherein said object-handling activity comprises a ball-handling activity.

22. The method of claim 1, wherein said sport-related activity comprises an activity of at least one of basketball, baseball, soccer, American football, ice hockey, field hockey, rugby, lacrosse, cricket, golf, tennis, table tennis, volleyball, car racing, motorcycle racing, bicycle racing, polo, boxing, skiing, snowboarding, fencing, windsurfing, sailing, kite surfing, and hang gliding.

23. The method claim 22, wherein said sport-related activity comprises a martial art activity of at least one of wrestling, judo, karate, sumo, jujitsu, kick boxing, aikido, taekwondo, and kung-fu.

24. The method of claim 23, wherein said sport-related activity comprises an activity performed by a plurality of subjects collectively in a team, and wherein at least one cognitive skill is related to performance by a subject as part of said team.

25. The method of claim 1, wherein said determining said training strategy further comprises characterizing the subject.

26. A method for training a subject for control processes in a task, comprising: designing a cognitive simulator for training the subject in the task; constructing a trainer for training the subject according to said cognitive simulator, said trainer comprising software operated by a computer; determining a training plan for training the subject with said trainer, wherein the control process is selected from the group consisting of one or more of executive or attention control processes; the method further comprising: decomposing the task into a plurality of cognitive skills for control processes before said designing said cognitive simulator, such that said designing is performed according to said plurality of cognitive skills; wherein said decomposing the task into said plurality of cognitive skills further comprises: decomposing the task into a plurality of actions; and mapping said plurality of actions to said plurality of cognitive skills; wherein said mapping is performed automatically.

27. The method of claim 26, wherein said designing said cognitive simulator comprises: modeling the task to form a model; and designing said cognitive simulator according to said model.

28. The method of claim 26, wherein said determining said training plan comprises: providing a plurality of cognitive building components; and composing said training plan from said plurality of cognitive building components.

29. A method for training a subject in a plurality of cognitive skills for a task, comprising: mapping a plurality of actions associated with the task into the plurality of cognitive skills; determining a training strategy according to said plurality of cognitive skills; and constructing a trainer for training the subject according to said training strategy, wherein operation of said trainer does not require physical fidelity to the task; wherein the task comprises a sport-related object-handling activity; and wherein said software for training the subject provides a plurality of stimuli that are not identical to stimuli received by the subject during performance of the task.

30. The method of claim 29, wherein said object-handling activity comprises a ball-handling activity.

31. A method for training a subject for control processes in a task, comprising: decomposing the task into a plurality of cognitive skills related to the control processes, wherein said decomposing the task into said plurality of cognitive skills further comprises: decomposing the task into a plurality of actions; and mapping said plurality of actions to said plurality of cognitive skills, wherein said mapping further comprises: analyzing said plurality of actions to determine a plurality of cognitive actions, wherein said cognitive actions are mapped to said plurality of cognitive skills; determining a training strategy according to said plurality of cognitive skills; and constructing a trainer, said trainer comprising software operated by a computer for training the subject according to said training strategy, wherein operation of said trainer does not require any physical fidelity to the task, wherein the control process is selected from the group consisting of one or more of executive or attention control processes; wherein said mapping is performed automatically.

32. A method for training a subject for control processes in a task, comprising: decomposing the task into a plurality of cognitive skills related to the control processes, wherein said decomposing the task into said plurality of cognitive skills further comprises: decomposing the task into a plurality of actions; and mapping said plurality of actions to said plurality of cognitive skills, wherein said mapping further comprises: analyzing said plurality of actions to determine a plurality of cognitive actions, wherein said cognitive actions are mapped to said plurality of cognitive skills; determining a training strategy according to said plurality of cognitive skills; and constructing a trainer, said trainer comprising software operated by a computer for training the subject according to said training strategy, wherein operation of said trainer does not require any physical fidelity to the task, wherein said software for training the subject provides a plurality of stimuli that are not identical to stimuli received by the subject during performance of the task, wherein the control process is selected from the group consisting of one or more of executive or attention control processes; wherein said cognitive skill comprises at least one of location perception, motion perception, prediction of future location and perception of distance; wherein the task comprises basketball and said perception of distance comprises perception of distance from a basket.

33. The method of claim 32, wherein said cognitive skill further comprises perception of a free team-mate.

34. The method of claim 32, wherein said cognitive skill further comprises a skill for a motor schema.

35. The method of claim 32, wherein said cognitive skill further comprises a skill for game tactics.

* * * * *